United States Patent [19]

Okumura et al.

[11] Patent Number: 4,948,515
[45] Date of Patent: Aug. 14, 1990

[54] FILTER FOR LIQUID AND METHOD OF FILTERING LIQUID

[75] Inventors: Yoshiharu Okumura; Katsutoshi Ando, both of Otsu, Japan

[73] Assignee: Toray Industries, Inc., Tokyo, Japan

[21] Appl. No.: 288,657

[22] Filed: Dec. 22, 1988

[30] Foreign Application Priority Data

Dec. 24, 1987 [JP] Japan ................. 62-329281

[51] Int. Cl.$^5$ ............................................. B01D 17/06
[52] U.S. Cl. .................................... 210/748; 210/243; 210/491; 204/186; 204/188
[58] Field of Search ............... 210/243, 492, 496, 748, 210/491; 55/528, DIG. 19; 204/188, 186

[56] References Cited

U.S. PATENT DOCUMENTS 4,323,374 4/1982 Shinagawa et al. .......... 55/DIG. 19
4,375,718 3/1983 Wadsworth et al. ......... 55/DIG. 19
4,579,637 4/1986 Jaisinghani et al. ................ 204/188

FOREIGN PATENT DOCUMENTS 52-71619   6/1977 Japan.
52-145871 12/1977 Japan.
61-181510  8/1986 Japan.
61-181511  8/1986 Japan.
63-130114  6/1988 Japan.

Primary Examiner—W. Gary Jones
Assistant Examiner—Matthew O. Savage
Attorney, Agent, or Firm—Armstrong, Nikaido, Marmelstein, Kubovcik & Murray

[57] ABSTRACT

A method for filtering liquids having a dielectric constant less than 10 is disclosed. The method includes the step of filtering a liquid through a porous layer of an electret, the electret consisting of a fibrous sheet having a surface charge density of at least $5 \times 10^{-11}$ coulombs/cm$^2$, wherein on the upstream side of the electret is laminated another porous layer having at least a porosity or an average fiber diameter greater than that of the electret layer. The upstream layer may consist of either a fibrous electret layer, or an uncharged fibrous layer.

22 Claims, 2 Drawing Sheets

FILTER FOR LIQUID AND METHOD OF FILTERING LIQUID

BACKGROUND OF THE INVENTION

The present invention relates to a filter for liquid and a method of filtering liquid using the filter. More specifically, the invention relates to a filter for liquid capable of removing dust of the order of submicrons contained in the liquid and a method of filtering the liquid.

It is required to remove even fine dust of smaller than 1 μm from hydraulic fluids lubricating oils and electro discharge machining oils. However, mechanical filters such as paper filters, non-woven fabric filters and granular filters can remove dust of sizes of down to 5 μm at the smallest but can no more remove dust of the order of submicrons. With the above-mentioned conventional mechanical filters, furthermore, if the mesh is decreased to increase the filtering efficiency, the pressure drop increases and the clogging develops at an early time causing the life of the filter to be shortened. Using the conventional mechanical filters, therefore, it is not possible to effect the precision filtration of the order of submicrons.

In order to carry out precision filtration, Japanese patent application Kokai publication No. 58-61845 proposes means according to which a pair of electrodes are provided in a solution to be filtered to assist the mechanical filter, and a voltage is applied across the electrodes to establish an electric field, so that dust in the liquid is collected or is migrated in the solution by the electric force of electric field. However, the method of providing the pair of electrodes as an auxiliary means necessitates additional facilities such as voltage generator and the like, inevitably involving disadvantage in handling the device and in manufacturing cost. Furthermore, even when it is attempted to carry out a higher degree of precision filtration, the object is never achieved as far as the method of providing the auxiliary electrodes is used in combination with the aforementioned conventional mechanical filters.

In recent years, there has been proposed the use of an air filter which is obtained in the form of electret fibrous sheet or an aggregate of pellets, the air filter being used for filtering dust suspended in the air. However, no example has been reported for using the above filter for filtering the liquid. The reason why the above filter is not used for filtering the liquid is attributed to that the electric force of electret does not effectively act in the liquid due to electric shielding effect of the liquid.

SUMMARY OF THE INVENTION

An object of the present invention is to provide a filter for liquid which makes it possible to effect precision filtration of dust of the order of submicrons, as well as to provide a method of filtering the liquid using the filter.

Another object of the present invention is to provide a filter for liquid which makes it possible to effect precision filtration of the order of submicrons yet reducing the pressure drop and increasing the life of the filter, as well as to provide a method of filtering the liquid using the filter.

In order to achieve the above objects according to the present invention, use is made of a porous layer of electret as a filter for liquid, and liquids having dielectric constants of smaller than 10 are filtered.

By using the filter composed of porous layer of electret, liquids with dielectric constants of smaller than 10 are filtered, such that fine dust of the order of submicrons are adsorbed and held on the surfaces of the porous layer and in the inner layers thereof. Therefore, a very high filtering efficiency is exhibited.

DETAILED DESCRIPTION OF THE INVENTION

Figure 1:
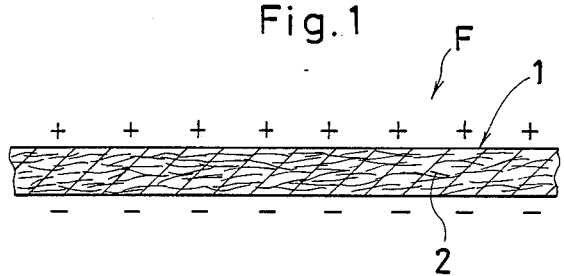
FIG. 1 is a vertical section view illustrating a filter composed of a fibrous sheet according to an embodiment of the present invention.

As described earlier, it has been known already to use the electret filter for cleaning the air. However, if the electret filter is simply used for filtering the liquid, polar substances contained in the liquid are configurated about the electric charge possessed by the electret filter, and the electric force of the electric charge is not effectively utilized for the filtration due to the shielding effect. In practice, no distinguished effect is recognized even when particles in a liquid such as water, alcohol, or the like are filtered through the electret filter.

The present inventors have discovered the fact that the filtering effect based on the electric force of the electret filter varies greatly depending upon the dielectric constant of the liquid when being applied to the filtration of liquid, and has further discovered that the electret filter is effective for only those liquids that have small specific inductivities. More concretely, furthermore, it was found that satisfactory filtering effect is not obtained unless the liquid has a dielectric constant of smaller than 10. The dielectric constant of the liquid to be filtered should preferably be smaller 5, and more preferably be smaller than 3, such that increased filtering effect is exhibited. Here, the specific inductivity stands for a value measured in compliance with JIS C-2101.

The liquid having such a specific inductivity may be a non-aqueous liquid. Representative examples include various oils such as hydraulic fluids lubricating oils, insulating oils, electro discharge machining oils and fuels. Further, most of organic solvents can be listed, such as tetrachloroethylene, cumene, diethylbenzene, ethylbenzene, trimethylamine, trichloroethylene, chloroform, propylene chloride, tetrachloroethane, etc.

Liquids having high viscosities are not suited for being filtered. Liquids having high viscosities often cause the dust once adhered to the filter to be dissociated again from the filter surfaces due to their viscous forces. Therefore, the liquids to be filtered should desirably have a viscosity of smaller than 1000 cSt and more desirably smaller than 200 cSt.

The filter of the present invention exhibits filtering performance that is not affected by electric properties of the dust to be filtered such as whether the dust to be filtered has good electric conductivity or not, and favorably removes even those particles having good electric conductivity such as metal dust and carbon or even those particles having electric insulating properties such as oxides.

The porous layer constituting the filter of the present invention may be comprised of fibrous sheets or a laminate of many pellets, and should be suitably selected depending upon the object of using the filter or the place of installation. The material constituting the porous layer is selected from such materials that can be turned into electrets thereof. Such materials should have an electric resistivity of greater than $10^{13}$ ohms.cm and, preferably, greater than $10^{15}$ ohms.cm. Examples of such materials include synthetic resins such as polyolefin-type resins, polyester-type resins, polycarbonate-type resins, fluorine-containing resins and vinyl-type resins, and inorganic compounds such as glass and the like. Synthetic resins are particularly preferred. Among them, polyolefin-type resins such as polypropylene and polyethylene are most desired.

The porous layer used in the present invention comprised of a fibrous sheet is superior to that of the laminate of pellet aggregate from the standpoint of filtering efficiency and the easiness of use. There is no particular limitation with regard to the form of fibrous sheet provided the fibers are intermingled in a three-dimensional manner to form the porous layer. Preferred examples include non-woven fabrics, woven fabrics and knitted fabrics. In particular, the non-woven fabrics are most desired from the standpoint of production and cost. Fibers constituting the fibrous sheet preferably consist of those that are formed by spinning. However, it is also allowable to use fibers obtained by finely slitting the film-like material.

The non-woven fabrics should desirably be produced by the meltblowing process or the spunbonding process. The meltblowing process consists of blowing a molten resin from a melt spinneret in the form of filaments together with the compressed air to obtain a number of finely cut staple fibers which are then laminated on a net like a sheet. The non-woven fabric obtained by the meltblowing process features very fine fiber diameters and makes it possible to obtain a filter having a high filtering efficiency. The spunbonding process consists of laminating continuous fibers spun from the melt spinneret on the net in a random fashion to obtain a sheet. With the spunbonding process the fibers are not obtained that are as very fine as those obtained by the meltblowing process but it is allowed to obtain non-woven fabrics consisting of continuous fibers.

When the porous layer consists of a fibrous sheet, the porosity and the average fiber diameter serve as important factors that determine the filtering performance. According to the present invention, the average fiber diameter of fibers constituting the fibrous sheet should be smaller than 50 μm, preferably smaller than 20 μm, and more preferably smaller than 10 μm. Further, the porosity of the fibrous sheet should range from 60% to 98%, and preferably from 70% to 96%. Clogging easily takes place when the porosity is smaller than 60%, and the fibrous sheet undergoes the change in its form to deteriorate the liquid permeability when the porosity is greater than 98%.

Here, the average fiber diameter stands for a value found by taking a picture of a fibrous sheet using a scanning-type electron microscope (SEM), measuring the fiber diameters of fibers of at least 100 places in a random fashion, and arithmetically averaging the measured values. The porosity stands for a value found in compliance with the measuring method stipulated under JIS L-1096.

The porous layer composed of fibrous sheet or laminate of pelletized aggregate is electrified to be an electret and to have electrification on the surfaces thereof. The process for obtaining electret can be easily effected relying upon a variety of conventional methods such as thermal electret method, electroelectret method, radioelectret method, mechanoelectret method, and the like methods. The process for obtaining electret may be carried out simultaneously with the step for producing the porous layer, or before or after the step for producing the porous layer.

The porous layer of electret should have electric charge that is polarized to have different polarities on the front and back surfaces thereof. The porous layer having such a polarized structure favorably exhibits increased degree of electret effect.

However, the porous layer needs not necessarily have electric charge that is polarized on both the front and back surfaces. For instance, as will be described later, the porous layer obtained by slitting an electret film into a fiber and laminating or packaging the fiber in the form of a sheet does not usually possess electric charge that is polarized on the front and back surfaces thereof, but exhibit performance that is satisfactory as a filter.

The porous layer of electret should have a surface charge density Q of $5 \times 10^{-11}$ coulombs/cm$^2$ or more and, preferably $1 \times 10^{-10}$ coulombs/cm$^2$ or more when it is in the form of a fibrous sheet. In the case of the porous layer in the form of fibrous sheet obtained by slitting the electret film into a fiber, the surface electric charge density possessed by the film of before being slitted should be greater than $1 \times 10^{-9}$ coulombs/cm$^2$ or higher and, preferably $5 \times 10^{-9}$ coulombs/cm$^2$ or higher.

The surface charge density Q of the fibrous sheet or the film is found from a voltage V (V) measured across the terminals of the capacitor and a surface area S (cm$^2$) of the fibrous sheet or the film according to the following relationship, i.e., $$Q(\text{coulombs/cm}^2) \times C \times V/S$$

by interposing the fibrous sheet or the film between two pieces of metal plates that are connected to each other via a capacitor having a capacity C (farads).

FIG. 1 exemplifies a filter of the present invention. The filter F is comprised of a non-woven fibrous sheet 1 in which a number of fibers 2 are intermingled in a three-dimensional manner. The fibrous sheet 1 that is electrified to be an electret has an electrification that is polarized into positive and negative polarities on both the front and back surfaces thereof. The fibrous sheet 1 thus charged with electrification may be used alone as a filter F, or may be used in combination with other filters.

Figure 2:
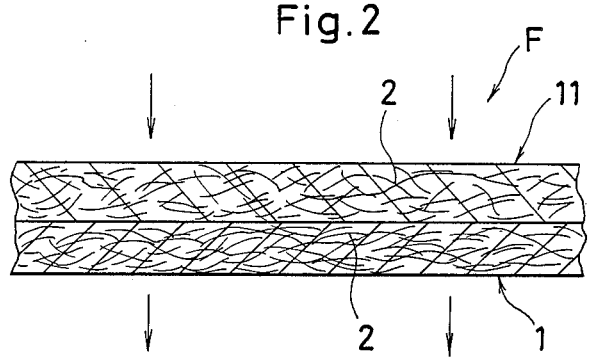
FIG. 2 is a vertical section view illustrating an example in which the filter of the present invention is used being laminated on other filter.

FIG. 2 illustrates an example where two such kinds of filters are used in combination. That is, on the upstream side of the fibrous sheet 1 of an electret of the present invention is laminated and adhered to another fibrous sheet 11 in which either the porosity or the average fiber diameter is greater than that of the fibrous sheet 1, in such a manner that at least either the fiber packaging density or the fiber diameter forms a gradient in the direction of flow of the filtered liquid indicated by arrows. The fibrous sheet 11 arranged on the upstream side has at least either the average fiber diameter or the porosity that is greater than that of the fibrous sheet 1. Therefore, the fibrous sheet 11 on the upstream side does not exhibit conspicuous filtering efficiency for fine dust, but favorably traps dust of relatively large particle sizes. Therefore, distinguished effects are exhibited with respect to suppressing the rise of pressure drop of the fibrous sheet 1 of an electret on the downstream side and with respect to extending the life before the sheet 1 is clogged. Thus, with the above-mentioned fibrous sheet 11 being arranged on the upstream side, the fibrous sheet 1 of an electret is allowed to exhibit its filtering performance favorably for extended periods of time.

The fibrous sheet 11 exhibits the function of primary filtration on the upstream side in the direction in which the liquid to be filtered flows. Therefore, even when a liquid containing large amounts of dust is to be treated, the filter is not loaded at an early time but makes it possible to carry out the filtration favorably for extended periods of time.

Thus, the fibrous sheet 11 laminated on the upstream side may be an electret or may not an electret. However, the filtration can be effected more efficiently when the fibrous sheet of an electret is used.

Figure 3:
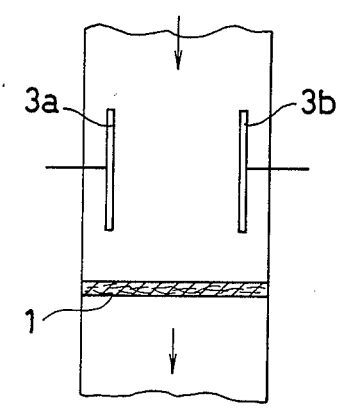
FIG. 3 is a schematic diagram of when the filter of the present invention is used in combination with a pair of electrodes.

As shown in FIG. 3, furthermore, the fibrous sheet 1 of an electret of the present invention may be used in combination with a pair of electrodes 3a and 3b. The pair of electrodes 3a and 3b are arranged on the upstream side of the flow of liquid that is to be filtered. When an electric field is established between the electrodes by the application of a voltage, fine dust is caused to cohere to form large particles in the liquid to be filtered. Therefore, the fibrous sheet 1 on the downstream side exhibits increased capturing effect to contribute to further increasing the precision filtering effect.

Figure 4:
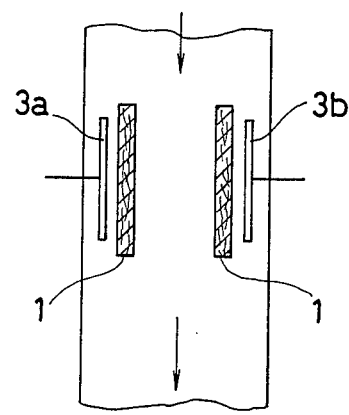
FIG. 4 is a schematic diagram of another example of when the filter of the present invention is used in combination with a pair of electrodes.

FIG. 4 illustrates a further example of using a pair of electrodes 3a and 3b in combination. In this example, two pieces of fibrous sheets 1 and 1 are arranged in parallel with the flow of the liquid to be filtered, and a pair of electrodes 3a and 3b are arranged on the outsides of the fibrous sheets 1 and 1. Due to the electric field established by the application of a voltage across the electrodes 3a and 3b, fine dust in the liquid to be filtered cohere to form large particles which then migrate toward the electrodes 3a and 3b and are captured by the fibrous sheets 1.

Figure 5:
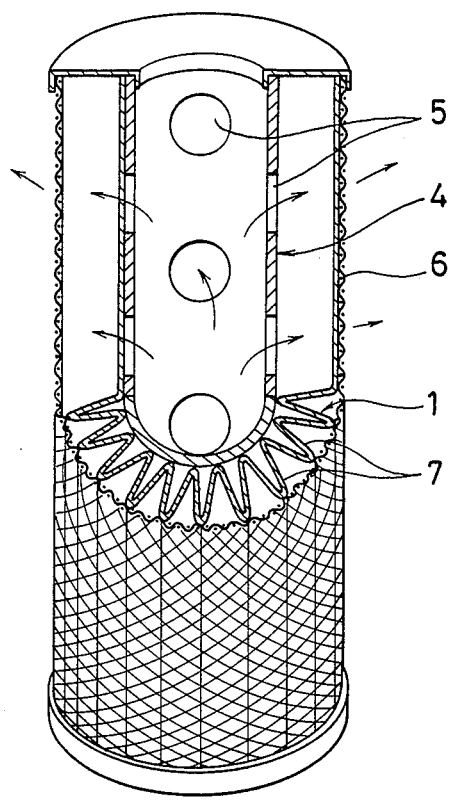
FIG. 5 is a perspective view showing partly in cross section the structure of filtration using the filter of the present invention.

The fibrous sheets may be used in a flat sheet-like form. Preferably, however, the fibrous sheets should be used being folded like pleats to obtain a filtering area that is as wide as possible. FIG. 5 illustrates an example in which a fibrous sheet 1 that is so folded as to form pleats 7 is arranged along the outer circumference of a pipe 4 having many through holes 5, and the outer periphery thereof is surrounded by a net 6. In the thus constructed filter, the liquid to be filtered passes through the fibrous sheet 1 from the inside of the pipe 4 through the holes 5 and flows to the outside of the net 6.

The aforementioned filters of the present invention are capable of efficiently removing dust of the order of submicrons contained in the liquids having dielectric constants of smaller than 10 such as hydraulic fluids, lubricating oils, insulating oils, electro discharge machining oils, fuels, as well as a variety of organic solvents. In addition, the precision filtering effects are obtained without the need of very decreasing the mesh of the porous layer. Therefore, there is obtained a filter that exhibits small pressure drop and extended life.

The functions and effects of the present invention will now be explained by way of concrete embodiments.

The filtering efficiency used in the below-mentioned embodiment is a value found in accordance with the following relation, Filtering efficiency $(\%) \times (X_1 - X_2) \times 100/X_1$ where $X_1$ denotes the dust density in the liquid before being filtered and $X_2$ denotes the dust density after being filtered.

Figure 6:
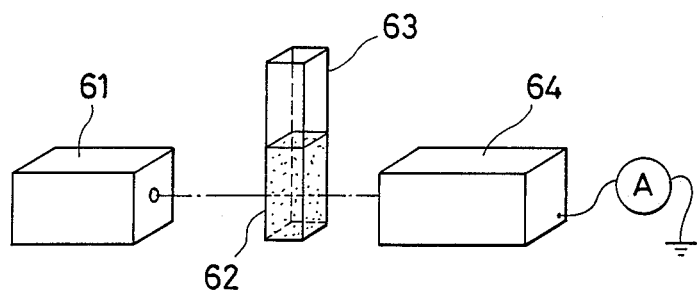
FIG. 6 is a diagram of a light transmission testing apparatus for evaluating the performance of a filter.

The density $X_2$ of dust in the liquid after the filtration is measured in a manner as described below using a measuring apparatus that is schematically shown in FIG. 6.

That is, liquids of a total of seven kinds of densities consisting of the liquid of before being filtered, and liquids obtained by diluting the above liquid into $\frac{1}{2}$, $\frac{1}{4}$, $\frac{1}{8}$, 1/16, 1/32 and 1/64 of densities thereof, are contained in quartz columns 63 having a thickness of 1 cm, respectively. Each of these quartz columns 63 is installed between a light projector 61 and a light receiver 64, the light having a wavelength of 500 nm and an incident luminous intensity $I_1$ from the light projector 61 is projected onto the quartz column 63, the intensity of the transmitted light is measured by the light receiving unit 64 to find a transmitted luminous intensity $I_2$, and a relationship between the density of dust in the liquid and the transmitted luminous intensity is approximated by an equation, $$I_2 = I_1 \cdot e^{-ax}$$

where $I_1$ denotes an incident luminous intensity $I_2$ denotes a transmitted luminous intensity, e denotes a base of natural logarithm, a denotes a constant, and x denotes a density of dust.

Then, the liquids that are filtered are measured for their transmitted luminous intensities by the above method, and the thus obtained transmitted luminous intensities are replaced for the above approximation, in order to find densities (estimated values) after the filtration.

EXAMPLE 1

A polypropylene was spun by the meltblowing process to prepare a non-woven fabric having an average fiber diameter of 4 $\mu$m, a weight of 20 g/m$^2$ and a thickness of 0.12 mm. The non-woven fabric was then electrified to be an electret through the electroelectret method to obtain a fibrous sheet having a surface charge density of $6.0 \times 10^{-10}$ coulombs/cm$^2$. Three pieces of such fibrous sheets were laminated to prepare a filter through which was filtered an insulating oil(having a dielectric constant of 2.2, and a viscosity of 8.7 cSt at 40° C.) in which have been dispersed 100 mg of JIS standard dust for testing (No. 11, having particle sizes of several microns or smaller) that have substantially electrically insulating property per 100 ml of the insulating oil.

The filtering operation was carried out by horizontally fixing the filter in the cylinder of a diameter of 6 cm, and pouring about 100 cc of liquid from the upper direction of the filter so that the liquid was permitted to drop naturally.

The filtering efficiency of the above filtering process was found to be 99.7% in terms of the transmitted luminous intensity of the filtered liquid, which was very favorable.

EXAMPLE 2

The same non-woven fabric of an electret as the one described in Example 1 was used as a filter to filtrate a tetrachloroethylene (having a dielectric constant of 2.2 and a viscosity of 0.9 cSt) containing dispersed therein 100 mg of carbon black particles (JIS standard dust for testing No. 12 having particle sizes of 0.03 to 0.2 $\mu$m) having good electric conductivity per 100 ml of the tetrachloroethylene.

The above filtering operation was carried out by fitting a circular filter of a diameter of 9 cm into a conical funnel, and pouring about 30 cc of liquid from the upper side of the filter so that the liquid was permitted to drop naturally.

The filtering efficiency of the above filtering process was found to be greater than 99.7% in terms of the transmitted luminous intensity of the filtered liquid, which was very favorable.

EXAMPLE 3

A polypropylene was spun by the spunbonding process to prepare a non-woven fabric having an average fiber diameter of 28 $\mu$m, a weight of 200 g/m$^2$ and a thickness of 1.7 mm. The non-woven fabric was then electrified to be an electret through the electroelectret method to obtain a fibrous sheet having a surface charge density of $7.8 \times 10^{-10}$ coulombs/cm$^2$. Two pieces of such fibrous sheets were laminated to prepare a filter through which the same liquid as the one used in Example 1 was filtered in the same manner as in Example 1.

The filtering efficiency in the above filtering process was found to be 97.9% in terms of the transmitted luminous intensity of the filtered liquid, which was very favorable.

EXAMPLE 4

The same liquid as the one used in Example 1 was filtered through the same method as the one employed in Example 1 by using a filtering layer obtained by laminating a spunbonded non-woven fabric having an average fiber diameter of 28 $\mu$m, a weight of 200 g/m$^2$ and a thickness of 1.7 mm, that has not been electrified to be an electret, on the upstream side of the same filter as the one described in Example 1.

The filtering efficiency in the above filtering process was found to be greater than 99.7% in terms of the transmitted luminous intensity of the filtered liquid, which was very favorable. Furthermore, the pressure drop remained small for more extended periods of time than the case of Example 1.

EXAMPLE 5

The same liquid as the one used in Example 1 was filtered through the same method as the one employed in Example 1 by using a filtering layer obtained by laminating a spunbonded non-woven fabric having an average fiber diameter of 28 $\mu$m, a weight of 200 g/m$^2$ and a thickness of 1.7 mm, that has been electrified to be an electret and that has a surface charge density of $7.8 \times 10^{-10}$ coulombs/cm$^2$, on the upstream side of the same filter as the one used in Example 1.

The filtering efficiency in the above filtering process was found to be greater than 99.7% in terms of the transmitted luminous intensity of the filtered liquid, which was very favorable. Furthermore, the pressure drop remained small for extended periods of time longer than that of the case of Example 4.

COMPARATIVE EXAMPLE 1

The same liquid as the one used in Example 1 was filtered through the same method as the one employed in Example 1 using, as a filter, the same non-woven fabric as the one used in Example 1 but which had not been electrified to be an electret.

The filtering efficiency was found to be 80.3% in terms of the transmitted luminous intensity of the filtered liquid, which was obviously inferior than that of the filter of Example 1.

COMPARATIVE EXAMPLE 2

The same liquid as the one used in Example 2 was filtered through the same method as the one employed in Example 2 using, as a filter, the same non-woven fabric as the one employed in Example 2 but which had not been electrified to be an electret.

The filtering efficiency was found to be 78.0% in terms of the transmitted luminous intensity of the filtered liquid, which was obviously inferior to that of the filter of Example 2.

COMPARATIVE EXAMPLE 3

Using the same non-woven filter as the one used in Example 2 as a filter, methanol dielectric constant of 31.2, was filtered in the same manner as in Example 2, the methanol containing dispersed therein 100 mg of JIS standard dust for testing (No. 11, having particle sizes of smaller than several microns) having substantially electrically insulating property per 100 ml of methanol.

The filtering efficiency was found to be 18.2% in terms of the transmitted luminous intensity of the filtered liquid, which was very low.

COMPARATIVE EXAMPLE 4

The same liquid as the one used in Comparative Example 3 was filtered through the same method as the one employed in Comparative Example 3 using, as a filter, the same non-woven fabric as the one used in Examples 1 and 2 but which had not been electrified to be an electret.

The filtering efficiency was found to be 16.4% in terms of the transmitted luminous intensity of the filtered liquid, which was very low.

COMPARATIVE EXAMPLE 5

The same liquid as the one used in Example 3 was filtered through the same method as the one used in Example 3 using, as a filter, the same non-woven fabric as the one used in Example 3 but which had not been electrified to be an electret.

The filtering efficiency was found to be 21.4% in terms of the transmitted luminous intensity of the filtered liquid, which was very low.

What is claimed is:

1. A method of filtering a liquid comprising the step of filtering a liquid having a dielectric constant of less than 10 through a porous layer of electret, wherein said porous layer comprises a fibrous sheet which has a surface charge density of at least $5 \times 10^{-11}$ coulombs/cm$^2$, wherein on the upstream side of said porous layer of electret is laminated another porous layer having at least either a porosity or an average fiber diameter that is greater than that of said porous layer of electret.

2. A method as in claim 1, wherein said fibrous sheet is a non-woven fabric.

3. A method as in claim 1, wherein the average fiber diameter of fibers constituting the fibrous sheet is smaller than 50 μm.

4. A method as in claim 1, wherein said fibrous sheet is a non-woven fabric prepared by a meltblowing process.

5. A process as in claim 1, wherein said fibrous sheet is a non-woven fabric prepared by a spunbonding process.

6. A process as in claim 1, wherein said porous layer of electret is a non-woven fabric prepared by a meltblowing process.

7. A process as in claim 1, wherein said another porous layer on the upstream side has been electrified to be an electret.

8. A method as in claim 1, wherein the laminated porous layers of the upstream side and the downstream side are adhered to each other.

9. A method as in claim 1, wherein said liquid is an oil.

10. A method as in claim 1, wherein said liquid is an organic solvent.

11. A method as in claim 1, wherein a pair of electrodes are arranged on the upstream side of said filter, and a voltage is applied between said pair of electrodes.

12. A method as in claim 1, wherein a pair of said filters are arranged in parallel with each other in the direction in which the liquid flows, two electrodes are arranged respectively on the outside of said pair of filters, and a voltage is applied between the two electrodes.

13. A method of filtering a liquid comprising the step of filtering a liquid having a dielectric constant of less than 10 through a porous layer of electret, wherein said porous layer comprises a fibrous sheet which comprises a fibrous material obtained by slitting an electret film having a surface charge density of at least $5 \times 10^{-9}$ coulombs/cm$^2$, wherein on the upstream side of said porous layer of electret is laminated another porous layer having at least either a porosity or an average fiber diameter that is greater than that of said porous layer of electret.

14. A method as in claim 13, wherein said fibrous sheet is a non-woven fabric.

15. A method as in claim 13, wherein the average fiber diameter of fibers constituting the fibrous sheet is smaller than 50 μm.

16. A process as in claim 13, wherein said porous layer of electret is a non-woven fabric prepared by a meltblowing process.

17. A process as in claim 13, wherein said another porous layer on the upstream side has been electrified to be an electret.

18. A method as in claim 13, wherein the laminated porous layers of the upstream side and the downstream side are adhered to each other.

19. A method as in claim 13, wherein said liquid is an oil.

20. A method as in claim 13, wherein said liquid is an organic solvent.

21. A method as in claim 13, wherein a pair of electrodes are arranged on the upstream side of said filter, and a voltage is applied between said pair of electrodes.

22. A method as in claim 13, wherein a pair of said filters are arranged in parallel with each other in the direction in which the liquid flows, two electrodes are arranged respectively on the outside of said pair of filters, and a voltage is applied between the two electrodes.

* * * * *